US009542188B2

(12) United States Patent
Shim et al.

(10) Patent No.: US 9,542,188 B2
(45) Date of Patent: Jan. 10, 2017

(54) HARDWARE DEBUGGING APPARATUS AND METHOD FOR SOFTWARE PIPELINED PROGRAM

(71) Applicant: SAMSUNG ELECTRONICS CO., LTD., Suwon-si (KR)

(72) Inventors: Hee-Jun Shim, Seoul (KR); Yeon-Gon Cho, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 882 days.

(21) Appl. No.: 13/734,526

(22) Filed: Jan. 4, 2013

(65) Prior Publication Data

US 2013/0191620 A1 Jul. 25, 2013

(30) Foreign Application Priority Data

Jan. 25, 2012 (KR) .................. 10-2012-0007383

(51) Int. Cl.
G06F 9/38 (2006.01)
G06F 11/36 (2006.01)

(52) U.S. Cl.
CPC ............ G06F 9/38 (2013.01); G06F 11/3636 (2013.01); G06F 11/3648 (2013.01)

(58) Field of Classification Search
CPC .... G06F 11/3636; G06F 9/38; G06F 11/3648; G06F 11/3652; G06F 9/45508; G06F 9/45516
See application file for complete search history.

(56) References Cited

U.S. PATENT DOCUMENTS

| 5,564,028 | A  | * | 10/1996 | Swoboda ................ G06F 9/321 |
|           |    |   |         | 710/264 |
| 6,178,499 | B1 |   | 1/2001  | Stotzer et al. |
| 6,505,296 | B2 |   | 1/2003  | Morris et al. |
| 7,543,186 | B2 |   | 6/2009  | Schultz |
| 7,631,305 | B2 |   | 12/2009 | Rong et al. |
| 8,170,859 | B1 | * | 5/2012  | Christensson ........ G06F 9/4812 |
|           |    |   |         | 703/22 |
| 2002/0120923 | A1 |   | 8/2002 | Granston et al. |
| 2007/0283105 | A1 | * | 12/2007 | Kalogeropulos ... G06F 12/0862 |
|           |    |   |         | 711/154 |

(Continued)

FOREIGN PATENT DOCUMENTS

EP 1 296 226 A2 3/2003
JP 60-250440 A 12/1985

(Continued)

OTHER PUBLICATIONS

Japanese Office Action issued on Jul. 5, 2016 in counterpart Japanese Application No. 2013-009247 (3 pages in Japanese; 3 pages in English).

(Continued)

*Primary Examiner* — Farley Abad
(74) *Attorney, Agent, or Firm* — NSIP Law

(57) ABSTRACT

Provided is a hardware debugging apparatus and method for a software-pipelined program. The hardware debugging apparatus and method overcome a currency problem caused during hardware debugging in the software-pipelined program by guarding certain execution blocks and restarting the processing of the software-pipelined program.

14 Claims, 6 Drawing Sheets

(56) References Cited

U.S. PATENT DOCUMENTS

| | | | |
|---|---|---|---|
| 2009/0049220 A1* | 2/2009 | Conti | G06F 13/24 |
| | | | 710/267 |
| 2009/0327674 A1 | 12/2009 | Codrescu et al. | |
| 2012/0117439 A1* | 5/2012 | Lee | H03M 13/1111 |
| | | | 714/752 |

FOREIGN PATENT DOCUMENTS

| | | |
|---|---|---|
| JP | 4-24836 A | 1/1992 |
| JP | 11-272474 A | 10/1999 |
| JP | 2002-251282 A | 9/2002 |

OTHER PUBLICATIONS

Chinese Office Action issued on Aug. 17, 2016 in counterpart Chinese Application No. 201310025976.X (11 pages in English; 9 pages in Chinese).

\* cited by examiner

HARDWARE DEBUGGING APPARATUS AND METHOD FOR SOFTWARE PIPELINED PROGRAM

CROSS-REFERENCE TO RELATED APPLICATION(S)

This application claims the benefit under 35 USC §119(a) of Korean Patent Application No. 10-2012-0007383, filed on Jan. 25, 2012, in the Korean Intellectual Property Office, the entire disclosure of which is incorporated herein by reference for all purposes.

BACKGROUND

1. Field

The following description relates to a hardware debugging apparatus and method for a software pipelined program.

2. Description of the Related Art

Software pipelining is a technique used to divide software into stages and process executions in a pipeline manner, in an effort to improve the processing performance of a system. Software pipelining may optimize the processing of a loop by making statements within an iteration independent of each other. Software pipelining removes dependencies so that seemingly sequential instructions may be executed in parallel. For example, software pipelining may overlap the execution of multiple iterations of software.

However, by overlapping the execution of several iterations of software, software pipelining makes it difficult to debug a processor. If a trigger signal such as a break point or a watch point occurs during hardware debugging of a software pipelined program, a section of code that should wait for a next iteration may be executed prematurely, or vice-versa. Consequently, a problem may occur in which a variable value of the software pipelined program is not identical with a variable value at the same point of a source program.

SUMMARY

In an aspect, there is provided a hardware debugging apparatus for a software-pipelined program, the hardware debugging apparatus including a predicate setter configured to set a trigger iteration count value based on an iteration count and an execution block difference, in response to a trigger event occurring, and a predicate early generator configured to generate a predicate in advance for an execution block based on the trigger iteration count value, in response to execution of a processor restarting.

The iteration count may indicate the number of times that operation for executing the software-pipelined program is repeated by a functional unit of the processor at the time of the occurrence of the trigger event.

The execution block difference may indicate a difference between the execution block in which the trigger event occurs and the execution block that has a predicate generated in advance.

The information about the iteration count and about the execution block difference may be generated at a compiling stage of the software-pipelined program.

If a current iteration count is greater than or equal to the set trigger iteration count value, the particular execution block may be an execution block included in the current iteration or a following iteration.

The hardware debugging apparatus may further comprise a processor re-starter configured to restart execution of the processor which is stopped upon the occurrence of the trigger event, in response to the trigger iteration count value being set.

The processor re-starter may be configured to back up a value of a register file of the processor or a value of a target memory prior to the occurrence of the trigger event.

The processor re-starter may be configured to restore the backed up value of the register file or the backed up value of the target memory and restart execution of the processor that is stopped, in response to the trigger iteration count value being set.

In an aspect, there is provided a hardware debugging method for a software-pipelined program, the method including, in response to a trigger event occurring, setting a trigger iteration count value based on information about a iteration count and information about a execution block difference of the software-pipelined program, and generating in advance a predicate with respect to a particular execution block based on the trigger iteration count value, in response to execution of a processor restarting.

The iteration count may indicate the number of times that operation for executing the software-pipelined program is repeated by a functional unit of the processor at the time of the occurrence of the trigger event.

The execution block difference may indicate a difference between the execution block in which the trigger event occurs and the execution block that has a predicate generated in advance.

The information about the iteration count and about the execution block difference may be generated at a compiling stage of the program.

If a current iteration count is greater than or equal to the set trigger iteration count value, the particular execution block may be an execution block in the current iteration or a following iteration.

The hardware debugging method may further comprise, in response to the trigger iteration count value being set, re-starting execution of the processor that is stopped upon the occurrence of the trigger event.

The restarting of the execution of the processor may comprise backing up a value of a register file of the processor or a value of a target memory, prior to the occurrence of the trigger event.

The restarting of the execution of the processor may comprise restoring the backed up value of the register file or the backed up value of the target memory, in response to the trigger iteration count value being set.

In an aspect, there is provided a method of a processor for handling an interrupt during processing of a software-pipelined loop, the method including processing a plurality of iterations of the software-pipelined loop by overlapping the execution of the plurality of iterations, and in response to receiving an interrupt during processing of an execution block of an iteration of the software-pipelined loop, stopping the processing of the iteration in which the interrupt occurs, and processing one or more remaining execution blocks of an iteration of which processing began prior to processing the iteration of the loop in which the interrupt occurs.

The method may further comprise, in response to the interrupt occurring, restoring contents of a register file of the processor to the contents prior to processing the software-pipelined loop, and restarting execution of the software-pipelined loop from the beginning.

The method may further comprise preventing the processing of an execution block of a subsequently overlapped iteration that is to be processed during the same stage as the iteration of the loop in which the interrupt occurs.

The execution block of the subsequently overlapped iteration may be guarded with a predicate to prevent the result of the processing of the execution block from being written to a register file of the processor.

Other features and aspects may be apparent from the following detailed description, the drawings, and the claims.

Figure 1:
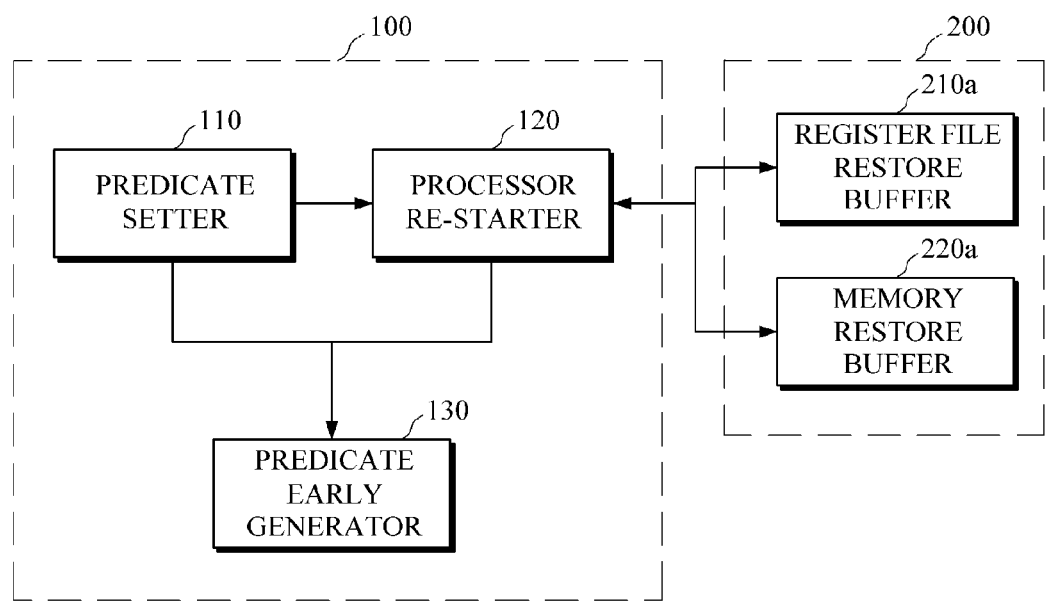
FIG. 1 is a diagram illustrating an example of a hardware debugging apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
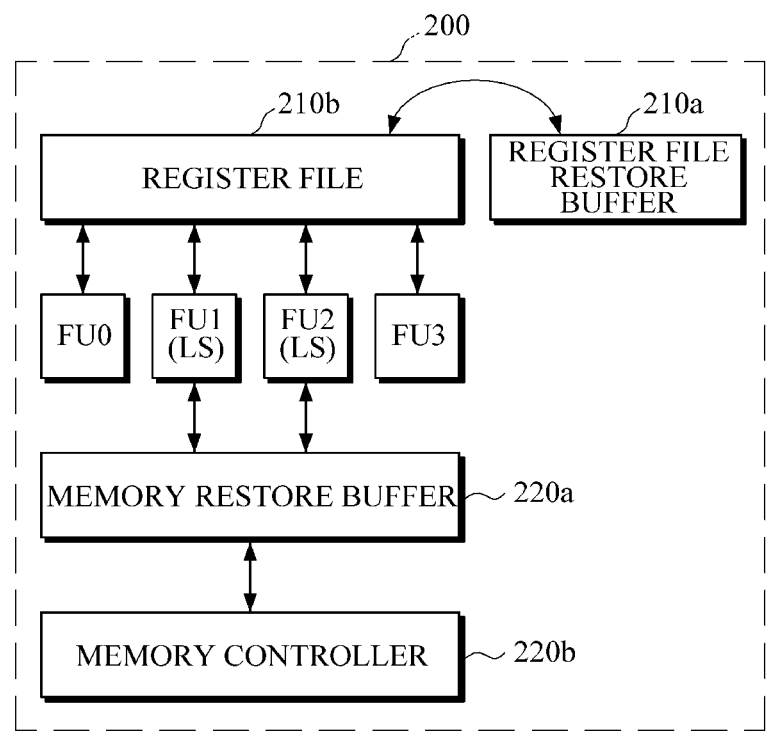
FIG. 2 is a diagram illustrating an example of a processor that includes a backup buffer.

FIG. 1 illustrates an example of a hardware debugging apparatus 100. FIG. 2 illustrates an example of a processor 200 that includes a backup buffer. For example, the hardware debugging apparatus 100 shown in FIG. 1 may be included in the processor 200 illustrated in the example shown in FIG. 2. The processor 200 may be included in a terminal, for example, a computer, a mobile phone, a tablet, an appliance, a sensor, and the like.

Referring to FIG. 1, the hardware debugging apparatus 100 includes a predicate setter 110, a processor re-starter 120, and a predicate early generator 130.

The predicate setter 110 may set a trigger iteration count value 'trig_iter_cnt' based on an iteration count 'iter_cnt' and an execution block difference 'exec_block_diff'. For example, the predicate setter 110 may set a trigger iteration count value in response to the occurrence of a trigger event such as an interrupt, a break point, a watch point, and the like. The iteration count 'iter_cnt' indicates the number of times that an operation for executing a software-pipelined program is repeated by each functional unit of a processor at the time of the occurrence of a trigger event.

The execution block difference 'exec_block_diff' indicates a difference between an execution block in which the trigger event occurs and an execution block which is subject to having a predicate generated in advance. Information about the iteration count 'inter_cnt' and the execution block difference 'exec_block_diff' may be generated in advanced at the compiling stage of the program.

Upon the occurrence of a trigger event, the processor may be stopped. For example, if a trigger event occurs during a particular iteration of a loop, the number of times that the loop is executed may become different from one execution block to another, which may lead to currency problems. To address this problem, the processor re-starter 120 may reset the processor and restart a loop in response to the trigger event or in response to the predicate setter 110 setting the trigger iteration count 'trig_iter_cnt'. Therefore, the loop is re-executed from the beginning and a predicate is generated early to prevent such currency problems.

Referring to FIG. 2, the processor 200 includes a register file 210b, multiple functional units FU0, FU1, FU2, and FU3, and a memory controller 220. In addition, the processor 200 may further include an additional register file restore buffer 210a and a memory restore buffer 220a. As an example, the processor 200 may be a coarse-grained array (CGA)-based reconfigurable processor.

During operation, each of the functional units FU0, FU1, FU2, and FU3 may execute various operations until a trigger event occurs, and results of executing operations may be updated in the register file 210b, which may cause initial 'live-in' and/or 'live-out' values of a register to change. In addition, a memory write operation may cause the memory controller 220b to change a value of a target memory. Therefore, to enable the processor 200 to restart from the beginning upon the occurrence of the trigger event, the changed register value of the register file 210b or the changed value of a memory should be restored to an initial condition.

The processor re-starter 120 may back up register values of the register file 210b in the register file restore buffer 210a, in response to the processor 200 initially starting to operate. As another example, an original value of a target memory may be backed up in the memory restore buffer 220a while the processor 200 is operating.

In response to a trigger iteration count value 'trig_iter_cnt' being set by the predicate setter 110, the processor re-starter 120 may restore the register value that has been backed up in the register file restore buffer 210a to the register file 210b and may restore the original memory value that was backed up in the memory restore buffer 220a to the target memory. In response to the restoration being completed, the processor re-starter 120 may reset the processor 200 that is stopped upon the occurrence of a trigger event and restart execution of the processor 200.

During the re-execution of the processor 200, the predicate early generator 130 may generate a predicate in advance for a particular execution block, based on the trigger iteration count value 'trig_iter_cnt'. As an example, if a current iteration count value resulting from the processor re-executing a loop is greater than or equal to the set trigger iteration count value 'trig_iter_cnt', the predicate early generator 130 may generate the predicate.

Figure 3A:
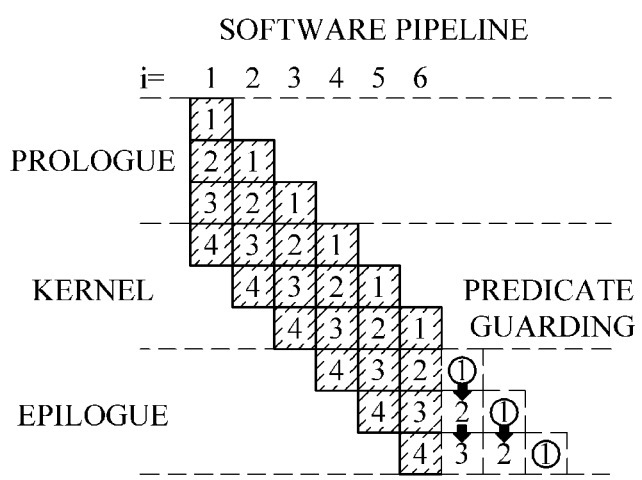
FIGS. 3A to 3C are diagrams illustrating examples for executing a software-pipelined program.
Figure 3B:
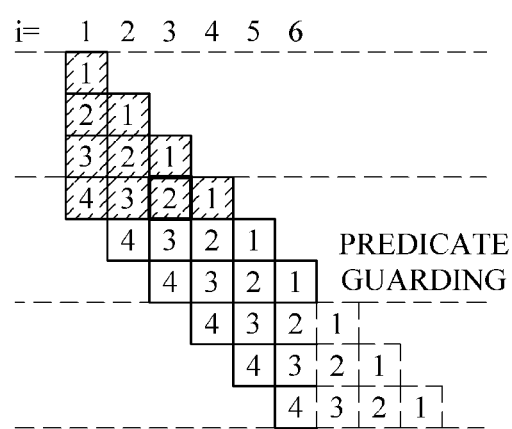
Figure 3C:
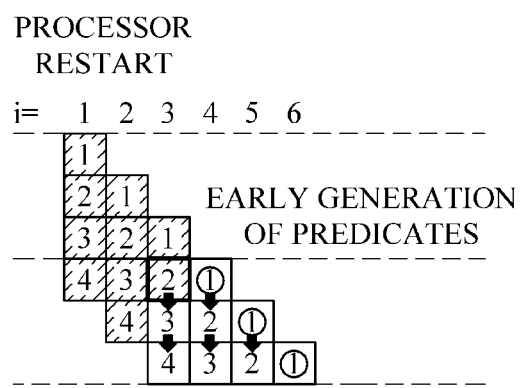

FIGS. 3A to 3C illustrate examples for executing a software-pipelined program. Various examples of a hardware debugging apparatus 100 shown in FIG. 1 are described with reference to FIGS. 3A to 3C.

In FIG. 3A, the first iteration (i=1) includes four instruction blocks. In this example, the first instruction block of the first iteration (i=1) is executed during a first stage. The second instruction block of the first iteration is executed during a second stage. Also, the first instruction block of the second iteration (1=2) is executed during the second stage.

FIG. 3A illustrates an example for executing a software-pipelined program that performs six iterations of execution of four execution blocks 1, 2, 3, and 4. In addition, an epilogue is implemented by guarding an execution block with a predicate. Because a CGA-based scheduler uses a modulo scheduling scheme, a prologue or epilogue of a loop may include an invalid operation. The execution of the invalid operation may be controlled by guarding an execution block with a predicate. In this example, if an invalid operation of the execution block which is guarded with a predicate is executed in the functional units FU0, FU1, FU2, FU3, and FU4, its execution result will not be written to the register file 210*b*.

FIG. 3B illustrates an example for generally processing a trigger event that occurs during the execution of a software-pipelined program. In this example, a trigger occurs in execution block 2 during the third iteration (i=3). As shown in FIG. 3B, when a trigger event occurs in the execution block 2 of the third iteration during a general debugging process, execution is performed up to the last execution block 1 of the fourth iteration, and thus the execution block 1 is executed four times and execution block 4 is executed one time.

As such, in general procedures for executing a software-pipelined program, at the time of the occurrence of a trigger event in FIG. 3B, the execution block 1 of the fourth iteration which should not be executed is executed. In addition, the execution block 4 of the second iteration which is supposed to be executed is not executed, and thus a currency problem arises.

If a trigger signal such as a break point or a watch point occurs, code that is supposed to wait for a next iteration is executed prematurely, or vice versa, and thus a currency problem with respect to a variable may arise. In the example of FIG. 3B, the trigger occurs at the second execution block of the third iteration. When the trigger event occurs while processing the execution block 2 of the third iteration, execution block 1 of the fourth iteration is also executed. In this example, execution block 1 is executed a total of four times and execution block 3 is executed only a total of two times, and thus there arises a currency problem.

FIG. 3C illustrates an example for executing a software-pipelined program when a trigger event occurs during the course of execution. In this example, the currency problem is prevented. As shown in FIG. 3C, if a trigger event occurs in execution block 2 of the third iteration (i=3), a predicate is generated. In this example, the predicate guards the execution of execution block 1 of the fourth iteration.

As described above, to generate the predicate for guarding the execution block 1 of the fourth iteration, a loop may be restarted in the processor. In addition, the processor re-starter 120 may back up a register value of the register file 210*b* in the register file restore buffer 210*a* when the processor 200 starts execution and before a trigger event occurs. In addition, the processor re-starter 120 may back up an original memory value in the memory restore buffer 220*a*. For example, the original memory value may be written as a target memory by the memory controller 220*b* during the course of execution of the processor 200.

In response to a trigger event occurring, the predicate setter 110 may generate trigger iteration count 'trig_iter_cnt' using information about an iteration count 'iter_cnt' and execution block difference 'exec_block_diff'. For example, the trigger iteration count 'trig_iter_cnt' may be calculated using the following equation.

$$\text{trig\_iter\_cnt} = \text{iter\_cnt} - \text{exec\_block\_diff} + 1 \quad (1)$$

Referring to FIG. 3C, a trigger event occurs in the execution block 2 of the third iteration. In this example, the iteration count value 'iter_cnt' is 3 at the time of the occurrence of the trigger. In addition, the execution block difference 'exec_block_diff' is 1 because an execution block at which the trigger event occurs is execution block 2 and an execution block which should not be executed, that is, an execution block at which a predicate should be generated early is execution block 1. Inputting these values into equation 1, the trigger iteration count value 'trig_iter_cnt' is calculated as 3.

In response to the trigger iteration count 'trig_iter_cnt' being set, the processor re-starter 120 may restore the backed up register value and memory, and reset the processor 200 and restart execution of the processor 200. Accordingly, the processor 200 may restart the execution of the software-pipelined loop from the first execution block of the first iteration.

The processor 200 restarts and executes the program from the beginning. For example, if a current iteration count is greater than or equal to the set trigger iteration count 'trig_iter_cnt', the processor early generator 130 may generate predicates in advance with respect to execution blocks in the current iteration and following iterations, and may guard the operation on the execution blocks. For example, if a current iteration count becomes 4 while re-executing the iteration of the processor, a predicate may be generated in advance for execution block 1 at the time of starting the fourth iteration. Consequently, when the processor executes the fourth iteration, it is possible to guard the execution block 1 with the predicate.

Thereafter, while executing during a fifth time stage, because the execution block 4 of the second iteration (i=2) does not have a predicate generated in advance, execution of the execution block 4 for the second iteration is performed. Conversely, execution block 3 of the third iteration may receive predicate information from the execution block 2 of the third iteration executed at the previous stage in which the trigger event occurs, and may be guarded with the predicate. Then, the execution block 2 of the fourth iteration may receive the predicate information from the execution block 1 of the fourth iteration in which the predicate was generated at the previous stage of the same loop, and may be guarded with the predicate.

The processor 200 may enter into debugging mode, in response to the execution being completely performed on to the epilogue in such a manner as above.

In the example of FIG. 3C, a currency problem is prevented. The first iteration and the second iteration are fully performed, and the processing of the loop is prevented from execution block 3 at the third iteration to execution block 4 of the sixth iteration. To implement this, a CGA restart function and a method for predicate early generation may be performed.

Figure 4:
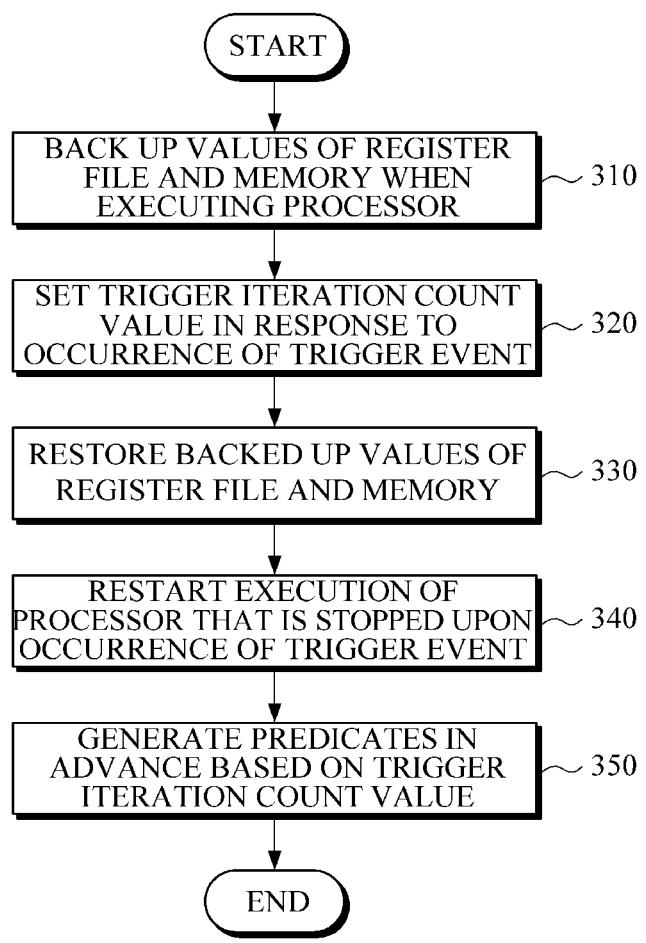
FIG. 4 is a flowchart illustrating an example of a hardware debugging method.

FIG. 4 illustrates an example of a hardware debugging method.

Referring to FIG. 4 in conjunction with FIG. 1, in 310, the processor re-starter 120 backs up a register value of the register file 210*b* in the register file restore buffer 210*a* in response to the processor 200 starting to operate, and backs up an original value of a target memory in the memory restore buffer 220*a* before the memory controller 220*b* changes a value of the target memory.

Thereafter, in response to the occurrence of a trigger event, such as a breakpoint or a watch point, the predicate setter 110 may compute a trigger iteration count 'trig_iter_cnt' using an iteration count 'iter_cnt' and an execution block difference 'exec_block_diff'. For example, information about the iteration count 'iter_cnt' and the execution block difference 'exec_block_diff' may be generated at the compiling stage of the program. Examples of the generation of the trigger iteration count 'trig_iter_cnt' are described with reference to FIGS. 3A to 3C.

In response to the trigger iteration count 'trig_iter_cnt' being set, the processor re-starter 120 restores the values backed up in the respective register file restore buffer 210*a* and memory restore buffer 220*a* to the register file 210*b* and the target memory 220*b*, respectively, in 330.

In 340, the processor re-starter 120 resets the processor 200 which is stopped upon the occurrence of the trigger event and restarts execution of the processor 200. As described above with reference to FIGS. 3A to 3C, if a current iteration count is greater than or equal to the set trigger iteration count 'trig_iter_cnt' when the execution of the processor 200 restarts, the predicate early generator 130 may generate predicates in advance with respect to execution blocks in the current iteration and following iterations so that the execution blocks can be guarded, in 350.

According to the examples herein, it is possible to prevent a currency problem which may be caused by a difference of execution times between execution blocks as a result of a trigger event occurring while a particular iteration of a loop is being executed, as shown in FIG. 3B.

When a trigger event occurs during hardware debugging of a software-pipelined program, execution of a processor is restarted and predicates are generated in advance, thereby preventing a currency problem and improving the debugging capability of a processor.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other is implementations are within the scope of the following claims.

What is claimed is:

1. A hardware debugging apparatus for a software-pipelined program, the hardware debugging apparatus comprising:
   a predicate setter configured to set a trigger iteration count value based on an iteration count and an execution block difference, in response to a trigger event occurring; and
   a predicate early generator configured to generate a predicate in advance for an execution block based on the trigger iteration count value, in response to execution of a processor restarting,
   wherein the execution block difference indicates a difference between an execution block in which the trigger event occurs and the execution block that has the predicate generated in advance.

2. The hardware debugging apparatus of claim 1, wherein the iteration count indicates the number of times that operation for executing the software-pipelined program is repeated by a functional unit of the processor at the time of the occurrence of the trigger event.

3. The hardware debugging apparatus of claim 1, wherein the information about the iteration count and about the execution block difference are generated at a compiling stage of the software-pipelined program.

4. The hardware debugging apparatus of claim 1, wherein, if a count of a current iteration is greater than or equal to the set trigger iteration count value, the execution block is an execution block included in the current iteration or a following iteration.

5. The hardware debugging apparatus of claim 1, further comprising:
   a processor re-starter configured to restart execution of the processor which is stopped upon the occurrence of the trigger event, in response to the trigger iteration count value being set.

6. The hardware debugging apparatus of claim 5, wherein the processor re-starter is configured to back up a value of a register file of the processor or a value of a target memory prior to the occurrence of the trigger event.

7. The hardware debugging apparatus of claim 6, wherein the processor re-starter is configured to restore the backed up value of the register file or the backed up value of the target memory and restart execution of the processor that is stopped, in response to the trigger iteration count value being set.

8. A hardware debugging method for a software-pipelined program, the method comprising:
- in response to a trigger event occurring, setting a trigger iteration count value based on information about a iteration count and information about an execution block difference of the software-pipelined program; and
- generating in advance a predicate with respect to a particular execution block based on the trigger iteration count value, in response to execution of a processor restarting,
- wherein the execution block difference indicates a difference between an execution block in which the trigger event occurs and the particular execution block that has a predicate generated in advance.

9. The hardware debugging method of claim 8, wherein the iteration count indicates the number of times that operation for executing the software-pipelined program is repeated by a functional unit of the processor at the time of the occurrence of the trigger event.

10. The hardware debugging method of claim 8, wherein the information about the iteration count and about the execution block difference are generated at a compiling stage of the program.

11. The hardware debugging method of claim 8, wherein, if a count of a current iteration is greater than or equal to the set trigger iteration count value, the particular execution block is an execution block in the current iteration or a following iteration.

12. The hardware debugging method of claim 8, further comprising:
- in response to the trigger iteration count value being set, re-starting execution of the processor that is stopped upon the occurrence of the trigger event.

13. The hardware debugging method of claim 12, wherein the restarting of the execution of the processor comprises backing up a value of a register file of the processor or a value of a target memory, prior to the occurrence of the trigger event.

14. The hardware debugging method of claim 13, wherein the restarting of the execution of the processor comprises restoring the backed up value of the register file or the backed up value of the target memory, in response to the trigger iteration count value being set.

* * * * *